US012750832B2

(12) United States Patent
Lei

(10) Patent No.: US 12,750,832 B2
(45) Date of Patent: Sep. 29, 2026

(54) METHOD AND APPARATUS FOR FREQUENCY DOMAIN RESOURCE ALLOCATION FOR MULTICAST DOWNLINK TRANSMISSIONS

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 345 days.

(21) Appl. No.: 18/695,125

(22) PCT Filed: Sep. 24, 2021

(86) PCT No.: PCT/CN2021/120180
§ 371 (c)(1),
(2) Date: Mar. 25, 2024

(87) PCT Pub. No.: WO2023/044718
PCT Pub. Date: Mar. 30, 2023

(65) Prior Publication Data
US 2024/0414700 A1 Dec. 12, 2024

(51) Int. Cl.
*H04W 72/0453* (2023.01)
*H04L 5/00* (2006.01)

(52) U.S. Cl.
CPC ....... *H04W 72/0453* (2013.01); *H04L 5/0046* (2013.01)

(58) Field of Classification Search
CPC ............... H04L 5/0046; H04L 5/0094; H04W 72/0453; H04W 72/232
See application file for complete search history.

(56) References Cited

U.S. PATENT DOCUMENTS

2019/0313378 A1 10/2019 Abdoli et al.
2019/0320430 A1* 10/2019 Kim .................. H04W 74/0833
(Continued)

FOREIGN PATENT DOCUMENTS

CN 112534758 A 3/2021

OTHER PUBLICATIONS

PCT/CN2021/120180, "International Search Report and Written Opinion", International Searching Authority, Jun. 1, 2022, pp. 1-7.
(Continued)

*Primary Examiner* — Kashif Siddiqui
(74) *Attorney, Agent, or Firm* — Kunzler Needham & Hilton

(57) ABSTRACT

Embodiments of the present disclosure relate to frequency domain resource allocation for DL transmissions. According to some embodiments of the disclosure, a method performed by a UE may include: receiving, within a frequency region common to a group of UEs including the UE, a first DCI format with a CRC scrambled by a first RNTI for scheduling a DL transmission, wherein the first DCI format and the DL transmission are common to the group of UEs, and the payload size of the first DCI format is equal to the payload size of a fallback DCI format with a CRC scrambled by a second RNTI specific to the UE and monitored in a CSS; determining the size of an FDRA field in the first DCI format based on at least one of the bandwidth of the frequency region and the size of an FDRA field in the fallback DCI format; and receiving the DL transmission on a plurality of RBs within the frequency region according to the FDRA field in the first DCI format.

20 Claims, 5 Drawing Sheets

(56) References Cited

U.S. PATENT DOCUMENTS

| | | | | |
|---|---|---|---|---|
| 2020/0154415 | A1* | 5/2020 | Oh | H04W 72/53 |
| 2020/0162208 | A1* | 5/2020 | Moon | H04L 1/189 |
| 2020/0260414 | A1* | 8/2020 | Song | H04L 5/0092 |
| 2021/0195620 | A1 | 6/2021 | Yoshimura et al. | |
| 2022/0393847 | A1* | 12/2022 | Moon | H04L 5/14 |
| 2023/0224891 | A1* | 7/2023 | Noh | H04L 5/0044 370/329 |
| 2023/0247648 | A1* | 8/2023 | Oh | H04W 48/16 370/252 |

OTHER PUBLICATIONS

Vivo, "Remaining issues on eMBB DCI format", 3GPP TSG RAN WG1 Meeting #93 R1-1806058, May 21-25, 2018, pp. 1-7.

Huawei et al., "Resource configuration and group scheduling for RRC_Connected UEs", 3GPP TSG RAN WG1 #106-e R1-2106438, Aug. 16-27, 2021, pp. 1-7.

Vivo, "Discussion on mechanisms to support group scheduling for RRC_Connected UEs", 3GPP TSG RAN WG1 #106-e R1-2106623, Aug. 16-27, 2021, pp. 1-14.

Nokia et al., "Group Scheduling Mechanisms to Support 5G Multicast / Broadcast Services for RRC_Connected UEs", 3GPP TSG RAN WG1 Meeting #106-e R1-2106662, Aug. 16-27, 2021, pp. 1-19.

Spreadtrum Communications, "Discussion on MBS group scheduling for RRC_Connected UEs", 3GPP TSG RAN WG1 #106-e R1-2106716, Aug. 16-27, 2021, pp. 1-4.

ZTE, "Discussion on mechanisms to Support Group Scheduling for RRC_Connected UEs", 3GPP TSG RAN WG1 #106-e R1-2106745, Aug. 16-27, 2021, pp. 1-14.

Sony, "Considerations on MBS group scheduling for RRC_ Connected UEs", 3GPP TSG RAN WG1 #106-e R1-21006820, Aug. 16-27, 2021, pp. 1-5.

Samsung, "Support of group scheduling for RRC_Connected UEs", 3GPP TSG RAN WG1 #106-e R1-2106912, Aug. 16-27, 2021, pp. 1-8.

Catt, "Discussion on group scheduling mechanism for RRC_ Connected UEs in MBS", 3GPP TSG RAN WG1 Meeting #106-e R1-2106945, Aug. 16-27, 2021, pp. 1-12.

Etri, "Common frequency resource configuration for multicast of RRC_Connected UEs", 3GPP TSG RAN WG1 Meeting #106-e R1-2106996, Aug. 16-27, 2021, pp. 1-3.

Futurewei, "Group Scheduling Aspects for Connected UEs", 3GPP TSG RAN WG1 #106-e R1-2107093, Aug. 16-27, 2021, pp. 1-8.

Nec, "Discussion on Group Scheduling Mechanisms for RRC_ Connected UEs", 3GPP TSG RAN WG1 #106-e R1-2107137, Aug. 16-27, 2021, pp. 1-6.

Lenovo et al., "On group scheduling mechanism for NR MBS", 3GPP TSG RAN WG1 #106-e R1-2107160, Aug. 16-27, 2021, pp. 1-9.

Potevio, "Discussion on group scheduling mechanisms for RRC_ Connected UEs", 3GPP TSG RAN WG1 #106-e R1-2107201, Aug. 16-27, 2021, pp. 1-3.

OPPO, "Discussion on group Scheduling mechanism for RRC_ Connected UEs", 3GPP TSG RAN WG1 #106-e R1-2107229, Aug. 16-27, 2021, pp. 1-8.

Qualcomm Inc., "View on group scheduling for Multicast RRC_ Connected UEs", 3GPP TSG RAN WG1 #106-e R1-2107369, Aug. 16-27, 2021, pp. 1-14.

Google Inc., "Discussion on group scheduling mechanism for RRC_Connected UEs", 3GPP TSG-RAN-WG1 #106-e R1-2107382, Aug. 16-27, 2021, pp. 1-3.

CMCC, "Discussion on group scheduling mechanisms", 3GPP TSG RAN WG1 #106-e R1-2107425, Aug. 16-27, 2021, pp. 1-12.

LG Electronics Inc., "Support of group scheduling for RRC_ Connected UEs", 3GPP TSG RAN WG1 Meeting #106-e R1-2107456, Aug. 16-27, 2021, pp. 1-12.

Mediatek Inc., "Discussion on NR MBS group scheduling for RRC_Connected UEs", 3GPP TSG RAN WG1 #106-e R1-2107514, Aug. 16-27, 2021, pp. 1-8.

Intel Corp., "NR MBS Group Scheduling for RRC_Connected UEs", 3GPP TSG RAN WG1 #105-e R1-2107611, Aug. 16-27, 2021, pp. 1-9.

Apple Inc., "Discussion on group scheduling mechanism for RRC_ Connected UEs", 3GPP TSG RAN WG1 #106-e R1-2107763, Aug. 16-27, 2021, pp. 1-4.

NTT Docomo, Inc., "Discussion on group scheduling mechanism for RRC_Connected UEs", 3GPP TSG-RAN WG1 #106-e R1-2107881, Aug. 16-27, 2021, pp. 1-10.

Xiaomi, "Discussion on mechanisms to support group scheduling for RRC_Connected UE", 3GPP TSG RAN WG1 #106-e R1-2107902, Aug. 16-27, 2021, pp. 1-8.

Chengdu TD Tech et al., "Group scheduling related discussion for RRC_Connected UEs", 3GPP TSG RAN WG1 Meeting#106-e R1-2107950, Aug. 16-27, 2021, pp. 1-3.

Convida Wireless, "Discussion on group scheduling mechanism for RRC_Connected UEs", 3GPP TSG-RAN WG1#106-e R1-2108026, Aug. 16-27, 2021, pp. 1-4.

Asustek, "Discussion on mechanisms to support group scheduling for RRC_Connected UEs", 3GPP TSG RAN WG1 #106-e R1-2108046, Aug. 16-27, 2021, pp. 1-5.

Ericsson, "Mechanisms to support MBS group scheduling for RRC_Connected UEs", 3GPP TSG-RAN WG1 Meeng #106-e R1-2108170, Aug. 10-27, 2021, pp. 1-30.

3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.

LG Electronics, "Remaining issues of random access for NR-U", 3GPP TSG RAN WG1 Meeting #103-e R1-2008042, Oct. 26-Nov. 13, 2020, pp. 1-8.

CMCC, "Summary#8 on mechanisms to support group scheduling for RRC_Connected UEs for NR MBS", 3GPP TSG RAN WG1 #106-e R1-2108574, Aug. 16-27, 2021, pp. 1-156.

* cited by examiner

METHOD AND APPARATUS FOR FREQUENCY DOMAIN RESOURCE ALLOCATION FOR MULTICAST DOWNLINK TRANSMISSIONS

TECHNICAL FIELD

Embodiments of the present disclosure generally relate to wireless communication technology, and more particularly to frequency domain resource allocation for downlink (DL) transmissions.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as an MBS group and may receive multicast transmissions from a base station (BS) via a physical downlink shared channel (PDSCH). The multicast transmissions may be scheduled by downlink control information (DCI).

There is a need for handling frequency domain resource allocation for DL transmissions such as PDSCH for a multicast service in a wireless communication system.

SUMMARY

Some embodiments of the present disclosure provide a user equipment (UE). The UE may include: a transceiver; and a processor coupled to the transceiver. The processor may be configured to: receive, within a frequency region common to a group of UEs including the UE, a first downlink control information (DCI) format with a cyclic redundancy check (CRC) scrambled by a first radio network temporary identifier (RNTI) for scheduling a downlink (DL) transmission, wherein the first DCI format and the DL transmission are common to the group of UEs, and the payload size of the first DCI format is equal to the payload size of a fallback DCI format with a CRC scrambled by a second RNTI specific to the UE and monitored in a common search space (CSS); determine the size of a frequency domain resource allocation (FDRA) field in the first DCI format based on at least one of the bandwidth of the frequency region and the size of an FDRA field in the fallback DCI format; and receive the DL transmission on a plurality of resource blocks (RBs) within the frequency region according to the FDRA field in the first DCI format.

Some embodiments of the present disclosure provide a base station (BS). The BS may include: a transceiver; and a processor coupled to the transceiver. The processor may be configured to: determine a bandwidth of a frequency region common to a group of user equipment (UEs); determine, based on at least one of the bandwidth of the frequency region and the size of a frequency domain resource allocation (FDRA) field in a fallback downlink control information (DCI) format with a cyclic redundancy check (CRC) scrambled by a UE-specific radio network temporary identifier (RNTI) and monitored in a common search space (CSS), the size of an FDRA field in a first DCI format with a CRC scrambled by a first RNTI for scheduling a downlink (DL) transmission, wherein the first DCI format and the DL transmission are common to the group of UEs, and the payload size of the first DCI format is equal to the payload size of the fallback DCI format; and transmit the first DCI format within the frequency region; transmit the DL transmission on a plurality of resource blocks (RBs) within the frequency region according to the FDRA field in the first DCI format.

In some embodiments of the present disclosure, the maximum size of the frequency region may be determined based on the maximum number of RBs indicated by a combination of the size of the FDRA field in the fallback DCI format and a first number of bits in the first DCI format reused for an FDRA field.

In some examples, the size of the FDRA field in the first DCI format may be equal to the combination of the size of the FDRA field in the fallback DCI format and the first number of bits in the first DCI format reused for an FDRA field. In response to a bit size for indicating allocated RBs in the frequency region being smaller than the size of the FDRA field in the first DCI format, at least one bit of the FDRA field in the first DCI format may be reserved. In some examples, the size of the FDRA field in the first DCI format may be determined based on the size of the frequency region. In response to the size of the FDRA field in the first DCI format being smaller than the combination of the size of the FDRA field in the fallback DCI format and the first number of bits in the first DCI format reused for an FDRA field, the first DCI format may be padded with at least one padding bit such that the payload size of the first DCI format is equal to that of the fallback DCI format.

In some embodiments of the present disclosure, RBs in the frequency region may be bundled into a plurality of RB bundles, and the FDRA field in the first DCI format may indicate one or more allocated RB bundles of the plurality of RB bundles. The number of RBs in an RB bundle of the plurality of RB bundles may be determined based on the minimum value which ensures that a bit size for indicating the one or more allocated RB bundles of the plurality of RB bundles is equal to or smaller than the size of the FDRA field in the fallback DCI format.

In some examples, the size of the FDRA field in the first DCI format may be equal to the size of the FDRA field in the fallback DCI format. In response to the bit size for indicating the one or more allocated RB bundles of the plurality of RB bundles being smaller than the size of the FDRA field in the first DCI format, at least one bit of the FDRA field in the first DCI format may be reserved. In some examples, the size of the FDRA field in the first DCI format may be determined based on the number of the plurality of RB bundles. In response to the size of the FDRA field in the first DCI format being smaller than the size of the FDRA field in the fallback DCI format, the first DCI format may be padded with at least one padding bit such that the payload size of the first DCI format is equal to that of the fallback DCI format.

In some embodiments of the present disclosure, a first DL resource allocation type may be used for the FDRA field in the first DCI format in response to at least one of following: the frequency region including more RBs than the maximum number of RBs scheduled by the fallback DCI format, and a bit size for indicating allocated RBs in the frequency region according to a second DL resource allocation type being greater than the size of the FDRA field in the fallback DCI format. The first DL resource allocation type may use the minimum size of resource block group (RBG) among possible RBG configurations which ensures that the number of RBGs in the frequency region is equal to or smaller than the size of the FDRA field in the fallback DCI format.

In some examples, the size of the FDRA field in the first DCI format may be equal to the size of the FDRA field in the fallback DCI format. In response to the number of RBGs in the frequency region being smaller than the size of the FDRA field in the first DCI format, at least one bit of the FDRA field in the first DCI format may be reserved. In some examples, the size of the FDRA field in the first DCI format may be determined based on the number of RBGs in the frequency region. In response to the size of the FDRA field in the first DCI format being smaller than the size of the FDRA field in the fallback DCI format, the first DCI format may be padded with at least one padding bit such that the payload size of the first DCI format is equal to that of the fallback DCI format.

In some embodiments of the present disclosure, the frequency region may be divided into at least one subband, each of which has the same or less bandwidth as control resource set (CORESET) 0 in response to the CORESET 0 being configured or an initial DL bandwidth part (BWP) of the group of UEs in response to the CORESET 0 being not configured. The FDRA field in the first DCI format may indicate a resource indication value (RIV) to be independently applied to each subband of the at least one subband. In some examples, the first DCI format may include a bitmap for indicating allocated subbands of the at least one subband, and each bit of the bitmap corresponds to a respective subband of the at least one subband. In some examples, the first DCI format may include an indicator for indicating a starting subband of one or more allocated subbands of the at least one subband and the number of contiguously allocated subbands of the one or more allocated subbands of the at least one subband. The size of the FDRA field in the first DCI format may be determined based on the bandwidth of the CORESET 0 in response to the CORESET 0 being configured or the initial DL BWP in response to the CORESET 0 being not configured.

Some embodiments of the present disclosure provide a method for wireless communication performed by a user equipment (UE). The method may include: receiving, within a frequency region common to a group of UEs including the UE, a first downlink control information (DCI) format with a cyclic redundancy check (CRC) scrambled by a first radio network temporary identifier (RNTI) for scheduling a downlink (DL) transmission, wherein the first DCI format and the DL transmission are common to the group of UEs, and the payload size of the first DCI format is equal to the payload size of a fallback DCI format with a CRC scrambled by a second RNTI specific to the UE and monitored in a common search space (CSS); determining the size of a frequency domain resource allocation (FDRA) field in the first DCI format based on at least one of the bandwidth of the frequency region and the size of an FDRA field in the fallback DCI format; and receiving the DL transmission on a plurality of resource blocks (RBs) within the frequency region according to the FDRA field in the first DCI format.

Some embodiments of the present disclosure provide a method for wireless communication performed by a BS. The method may include: determining a bandwidth of a frequency region common to a group of user equipment (UE); determining, based on at least one of the bandwidth of the frequency region and the size of a frequency domain resource allocation (FDRA) field in a fallback downlink control information (DCI) format with a cyclic redundancy check (CRC) scrambled by a UE-specific radio network temporary identifier (RNTI) and monitored in a common search space (CSS), the size of an FDRA field in a first DCI format with a CRC scrambled by a first RNTI for scheduling a downlink (DL) transmission, wherein the first DCI format and the DL transmission are common to the group of UEs, and the payload size of the first DCI format is equal to the payload size of the fallback DCI format; and transmitting the first DCI format within the frequency region; transmitting the DL transmission on a plurality of resource blocks (RBs) within the frequency region according to the FDRA field in the first DCI format.

Some embodiments of the present disclosure provide a UE. According to some embodiments of the present disclosure, the UE may include: a transceiver; and a processor coupled to the transceiver, wherein the transceiver and the processor may interact with each other so as to perform a method according to some embodiments of the present disclosure.

Some embodiments of the present disclosure provide a BS. According to some embodiments of the present disclosure, the BS may include: a transceiver; and a processor coupled to the transceiver, wherein the transceiver and the processor may interact with each other so as to perform a method according to some embodiments of the present disclosure.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
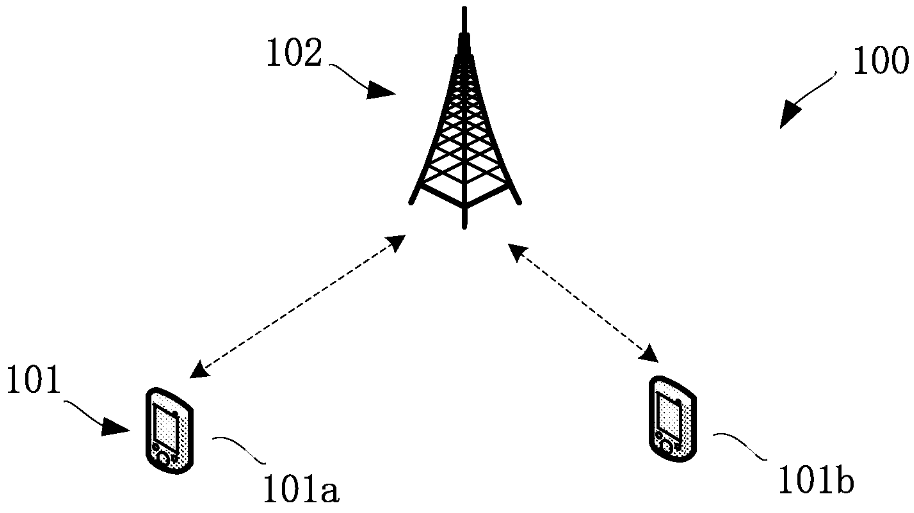
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101*a* and UE 101*b*) may be grouped as an MBS group to receive MBSs (e.g., an MBS PDSCH) from a BS (e.g., BS 102).

A group-common radio network temporary identifier (RNTI) (e.g., group-RNTI (G-RNTI)) is introduced for an MBS so that a UE can differentiate a DCI scheduling a group-common PDSCH carrying an MBS service from a DCI scheduling UE-specific PDSCH carrying a unicast service. For example, the cyclic redundancy check (CRC) of the DCI scheduling the group-common PDSCH may be scrambled by G-RNTI and the scheduled MBS PDSCH may also be scrambled by the G-RNTI. The CRC of the DCI scheduling the unicast PDSCH may be scrambled by a UE-specific RNTI (e.g., C-RNTI) and the scheduled unicast PDSCH may also be scrambled by the C-RNTI.

In some embodiments, two DCI formats, named the first DCI format and the second DCI format, can be used for the group-common PDCCH (GC-PDCCH). The first DCI format may take a fallback DCI format, such as DCI format 1_0, as a baseline and the second DCI format may take a non-fallback DCI format, such as DCI format 1_1, as a baseline.

According to 3GPP protocols, a "3+1" DCI size budget should be satisfied. That is, for a cell, the total number of different DCI sizes with a C-RNTI (hereinafter, "C-RNTI DCI size") is no more than 3, and the total number of different DCI sizes (including C-RNTI DCI size(s) and other RNTI DCI size(s)) is no more than 4. "Other RNTI DCI size" refers to the size of a DCI scrambled by an RNTI other than a C-RNTI. To achieve the DCI size budget, the following agreement has been reached by the 3GPP: for multicast of RRC-CONNECTED UEs, the size of the first DCI format for GC-PDCCH may be aligned with fallback DCI format (e.g., DCI format 1_0) with a CRC scrambled by UE-specific RNTI and monitored in a common search space (CSS).

Table 1 below shows an exemplary DCI format 1_0 with the CRC scrambled by C-RNTI. It should be understood that Table 1 is only for illustrative purposes, and should not be construed as limiting the embodiments of the present disclosure. For example, a DCI format 1_0 may include fewer or more DCI fields in some other embodiments of the present disclosure. The bit size of one or more DCI fields in Table 1 may be different in some other embodiments of the present disclosure.

TABLE 1

Fields of DCI format 1_0 with the CRC scrambled by C-RNTI

| DCI field | Size (bits) |
|---|---|
| Identifier for DCI formats | 1 |
| Frequency domain resource assignment | $\lceil \log_2(N_{RB}^{DL,BWP}(N_{RB}^{DL,BWP}+1)/2 \rceil$, where $N_{RB}^{DL,BWP}$ is the number of RBs of control resource set (CORESET) 0 or initial DL BWP |
| Time domain resource assignment | 4 |
| VRB-to-PRB mapping | 1 |
| Modulation and coding scheme | 5 |
| New data indicator | 1 |
| Redundancy version | 2 |
| HARQ process number | 4 |
| Downlink assignment index | 2 |
| TPC command for scheduled PUCCH | 2 |
| PUCCH resource indicator | 3 |
| PDSCH-to-HARQ_feedback timing indicator | 3 |

As shown in Table 1, the number of bits of the frequency domain resource assignment (FDRA) field of DCI format 1_0 with the CRC scrambled by C-RNTI and monitored in CSS is equal to $$\lceil \log_2(N_{RB}^{DL,BWP}(N_{RB}^{DL,BWP}+1)/2) \rceil$$

bits, where $$N_{RB}^{DL,BWP}$$

is given by the size of CORESET 0 if CORESET 0 is configured for the cell or by the size of an initial DL BWP if CORESET 0 is not configured for the cell.

In some embodiments, for an MBS, a common frequency resource (CFR) may be defined as an "MBS frequency region" with a number of contiguous resource blocks (RBs) (e.g., physical RBs (PRBs)). The CFR may be confined within the frequency resource of an associated dedicated unicast bandwidth part (BWP) to support simultaneous reception of unicast and multicast in the same slot. The group-common PDCCH and PDSCH may be transmitted within the CFR. The CFR configuration may be common to the group of UEs supporting the MBS. In some embodiments, the same subcarrier spacing and cyclic prefix of the CFR may be also configured to the group of UEs. In some embodiments, for RRC-CONNECTED UEs in the same group, the CFR may be configured to be associated with each UE's active BWP other than the initial DL BWP. For RRC-INACTIVE or IDLE mode UEs in the same group for broadcast reception, the CFR may be configured by a system information block (SIB) or other broadcast messages.

In this scenario, the number of bits of the FDRA field of the first DCI format (e.g., DCI format 1_0 with a CRC scrambled by G-RNTI) may be equal to $$\lceil \log_2(N_{RB}^{DL,CFR}(N_{RB}^{DL,CFR}+1)/2) \rceil$$

bits, where $$N_{RB}^{DL,CFR}$$

is given by the number of RBs of the CFR. When the CFR is configured with more RBs than CORESET 0 or an initial DL BWP, more bits are required in the FDRA field of DCI format 1_0 with a CRC scrambled by G-RNTI than the FDRA field of DCI format 1_0 with a CRC scrambled by C-RNTI.

Figure 2A:
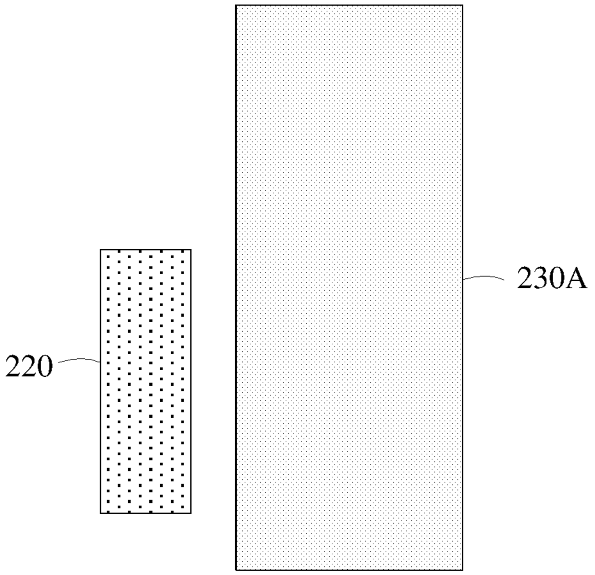
FIG. 2A illustrates exemplary radio resource allocation in accordance with some embodiments of the present disclosure.
Figure 2B:
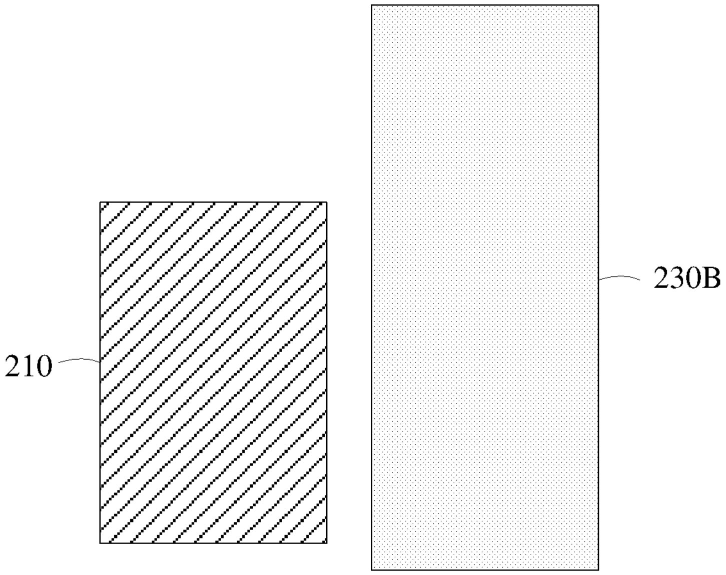
FIG. 2B illustrates exemplary radio resource allocation in accordance with some embodiments of the present disclosure.

FIGS. 2A and 2B illustrate exemplary radio resource allocations in accordance with some embodiments of the present disclosure. It should be understood that FIGS. 2A and 2B are only for illustrative purposes, and should not be construed as limiting the embodiments of the present disclosure.

Referring to FIG. 2A, on a serving cell, "CORESET 0" 220 is configured for a UE. The UE may be a member UE of a group of UEs. A BS may configure a CFR 230A for an MBS to the group of UEs via, for example, a radio resource control (RRC) signaling message. In FIG. 2A, the bandwidth of CFR 230A is wider than that of "CORESET 0" 220. For example, assuming "CORESET 0" 220 includes 24 RBs corresponding to 15 kHz sub-carrier spacing (SCS) and CFR 230A is configured with 106 RBs corresponding to 20 MHz bandwidth and 15 kHz SCS, the FDRA field of DCI format 1_0 with a CRC scrambled by C-RNTI and monitored in CSS requires 9 bits and the FDRA field of DCI format 1_0 with a CRC scrambled by G-RNTI requires 13 bits.

Referring to FIG. 2B, on a serving cell, CORESET 0 is not configured while an initial DL BWP 210 is configured for a UE. Initial DL BWP 210 may be configured by a system information block (SIB) 1. The UE may be a member UE of a group of UEs. A BS may configure a CFR 230B for an MBS to the group of UEs via, for example, a radio resource control (RRC) signaling message. In FIG. 2B, the bandwidth of CFR 230B is wider than that of initial DL BWP 210. For example, assuming initial DL BWP 210 includes 48 RBs corresponding to 15 kHz SCS and CFR 230B is configured with 216 RBs corresponding to 40 MHz bandwidth and 15 kHz SCS, the FDRA field of DCI format 1_0 with a CRC scrambled by C-RNTI and monitored in CSS requires 11 bits and the FDRA field of DCI format 1_0 with a CRC scrambled by G-RNTI requires 15 bits.

In some scenarios, DCI format 1_0 with a CRC scrambled by C-RNTI and monitored in CSS and DCI format 1_0 with a CRC scrambled by G-RNTI may have different payload sizes, which contravenes the above-mentioned 3GPP agreement and the "3+1" DCI size budget.

Embodiments of the present disclosure provide solutions to solve the above issues. For example, solutions for a DCI size alignment between the above two DCI formats are proposed. More details on the embodiments of the present disclosure will be illustrated in the following text in combination with the appended drawings.

To align the payload size of DCI format 1_0 with a CRC scrambled by UE-specific RNTI (e.g., C-RNTI) and monitored in CSS, the first DCI format (e.g., DCI format 1_0 with a CRC scrambled by G-RNTI) should firstly have approximately the same number of bits in the FDRA field as that of DCI format 1_0 with a CRC scrambled by UE-specific RNTI and monitored in CSS.

In some embodiments, at least one most significant bit (MSB) of the FDRA field of DCI format 1_0 with a CRC scrambled by G-RNTI is truncated until the two DCI formats have the same size. However, this would lead to many RBs within the CFR that cannot be scheduled. In some embodiments, DCI format 1_0 with a CRC scrambled by C-RNTI and monitored in CSS may be appended with at least one padding bit (e.g., "0") such that the two DCI formats have the same size. However, this would lead to too many unnecessary padding bits for DCI format 1_0 with a CRC scrambled by C-RNTI. Embodiments of the present disclosure provide enhanced solutions to solve the above issues. In these embodiments, each RB of the CFR can be addressed and the two DCI formats have the same payload size.

In some embodiments of the present disclosure, either resource allocation type 0 or type 1 may be used for allocating the frequency resource. Resource allocation type 0 is on a resource block group (RBG) level and resource allocation type 1 is on the RB level. In some embodiments, the resources (RBGs or RBs) assigned to a UE can be non-contiguous for type 0, while they must be contiguous for type 1.

According to resource allocation type 0, the resource block assignment information indicated by the FDRA field may include a bitmap indicating the allocated resource block groups (RBGs). An RBG may be a set of consecutive RBs (e.g., virtual resource blocks (VRBs)) defined based on, for example, the following Table 2, where the bandwidth part size is set to L (in number of RBs). It should be understood that Table 2 is only for illustrative purposes, and should not be construed as limiting the embodiments of the present disclosure.

TABLE 2

| Nominal RBG size P | | |
|---|---|---|
| Bandwidth Part Size in number of RBs | Configuration 1 | Configuration 2 |
| 1-36 | 2 | 4 |
| 37-72 | 4 | 8 |
| 73-144 | 8 | 16 |
| 145-275 | 16 | 16 |

According to the above Table 2, when the number of RBs in the frequency domain is 20 (i.e., between "1-36"), for example, a CFR is configured with 20 RBs, the number of VRBs in a RBG is 2 in the case of configuration 1 and is 4 in the case of configuration 2. An RRC signaling may indicate whether configuration 1 or configuration 2 is employed. The number of bits of the bitmap (e.g., the size of the FDRA field) may be equal to the total number of RBGs for the frequency domain, and may be determined by $N_{RBG}=\lceil L/P \rceil$.

According to resource allocation type 1, the resource block assignment information indicated by the FDRA field may indicate a set of contiguously allocated RBs (e.g., virtual resource blocks (VRBs)). The size of the FDRA field may be determined by, for example, $\lceil \log_2(L(L+1)/2) \rceil$ bits.

In some embodiments of the present disclosure, for a group of UEs receiving an MBS, to achieve the above-mentioned DCI payload size alignment, the maximum number of RBs which can be configured for a CFR may be determined based on a combination of the number of bits required for the FDRA field of the fallback DCI format (e.g., DCI format 1_0) with a CRC scrambled by a UE-specific RNTI (e.g., C-RNTI) and monitored in a CSS (hereinafter, referred to as "UE-specific fallback DCI format") and the number of bits (denoted as "M") in the first DCI format (e.g., DCI format 1_0 with a CRC scrambled by G-RNTI) reused for an FDRA field.

These M bits can be reused because they may not be useful for the group-common PDCCH of an MBS. For example, the 1-bit identifier (e.g., "Identifier for DCI formats" in Table 1) may not exist in the first DCI format as the first DCI format is always used for DL scheduling. Other fields, for example, the transmit power control (TPC) command field, may not exist in the first DCI format since the first DCI format is used for a group-common transmission.

In some examples, for DL resource allocation Type 1 for an MBS PDSCH, the CFR configuration should satisfy the following:

$$N_{RB}^{DL,CFR} <= X_{max}$$

and $X_{max}$ is the maximum X which satisfies the equation of:

$$\lceil \log_2(X(X+1)/2) \rceil = \lceil \log_2(N_{RB}^{DLBWP}(N_{RB}^{DLBWP}+1)/2) \rceil + M.$$

For DL resource allocation Type 0 for an MBS PDSCH, the CFR configuration should satisfy the following:

$$N_{RB}^{DL,CFR} <= X_{max}$$

and $X_{max}$ is the maximum X which satisfies the equation of $$\lceil X/P \rceil = \lceil \log_2(N_{RB}^{DLBWP}(N_{RB}^{DLBWP}+1)2) \rceil + M.$$

In the above equations, $$N_{RB}^{DL,CFR}$$

denotes the number of RBs within the CFR, $$N_{RB}^{DL,BWP}$$

is given by the size of CORESET 0 if CORESET 0 is configured for the cell or by the size of an initial DL bandwidth part if CORESET 0 is not configured for the cell. M denotes the number of bits which can be reused for the FDRA field indication in the first DCI format and M can be equal to 0 if no other field can be reused for the FDRA field. P is the RBG size determined based on Configuration 1 or Configuration 2 as shown in above Table 2. When DL resource allocation Type 0 is supported for an MBS PDSCH scheduled by the first DCI format and configured for the MBS PDSCH, Configuration 1 or Configuration 2 for the RBG size of P should be a group-common configuration for the group of UEs.

In some embodiments of the present disclosure, the number of bits (denoted as "Y") for the FDRA field of the first DCI format may be equal to a combination (e.g., sum) of the number of bits required for the FDRA field of the UE-specific fallback DCI format and the number of bits in the first DCI format which can be reused for an FDRA field so that the CFR can be configured with a maximum of $X_{max}$ RBs. For example, for either DL resource allocation Type 1 or DL resource, allocation Type 0, $$Y = \lceil \log_2(N_{RB}^{DL,BWP}(N_{RB}^{DL,BWP}+1)/2) \rceil + M.$$

In other words, the number of required bits of the FDRA field of the first DCI format may be determined based on the size of CORESET 0 or an initial DL BWP and the number of bits available for reuse for the FDRA field. When a CFR is configured with RBs smaller than $X_{max}$ RBs, some bits of the FDRA field of the first DCI format may be unused. For example, at least one MSB or least significant bit (LSB) of the FDRA field may be reserved.

Table 3 below shows an exemplary first DCI format. It should be understood that Table 3 is only for illustrative purposes, and should not be construed as limiting the embodiments of the present disclosure.

TABLE 3

| Fields of the first DCI format | |
|---|---|
| DCI fields | Size (bits) |
| ~~Identifier for DCI formats~~ | ~~1~~ |
| Frequency domain resource assignment | $\lceil \log_2(N_{RB}^{DL,BWP}(N_{RB}^{DL,BWP}+1)/2 \rceil + M$ |
| Time domain resource assignment | 4 |
| VRB-to-PRB mapping | 1 |
| Modulation and coding scheme | 5 |
| New data indicator | 1 |
| Redundancy version | 2 |
| HARQ process number | 4 |
| Downlink assignment index | 2 |
| ~~TPC command for scheduled PUCCH~~ | ~~2~~ |

TABLE 3-continued

| Fields of the first DCI format | |
|---|---|
| DCI fields | Size (bits) |
| PUCCH resource indicator | 3 |
| PDSCH-to-HARQ_feedbac k timing indicator | 3 |

In the example of Table 3, M=3 because the 1-bit Identifier field and the 2-bit TPC field are reused for an FDRA indication. It should be understood that another field(s) such as the PUCCH resource indicator may be reused for an FDRA indication in some other embodiments of the present disclosure.

For example, assuming that CORESET 0 including 24 RBs is configured on the serving cell of a UE and the 1-bit identifier and 2-bit TPC can be reused for an FDRA indication in the first DCI format, it can be determined that $$\lceil \log_2(N_{RB}^{DL,BWP}(N_{RB}^{DL,BWP}+1)/2) \rceil = 9$$

and M=3. Therefore, the FDRA field of the first DCI format may include 12 bits (i.e., 9+3) (regardless of DL resource allocation Type 1 or DL resource allocation Type 0). When the CFR is configured with smaller than 48 RBs, for DL resource allocation Type 1, 11 bits would be enough to schedule the 48 RBs, and thus a single MSB of the FDRA field may be reserved. For DL resource allocation Type 0 and RBG configuration 2 (e.g., according to Table 2, P=8), 6 bits would enough to schedule the 48 RBs, and thus 6 MSBs of the FDRA field may be reserved.

In some embodiments of the present disclosure, the number of bits for the FDRA field of the first DCI format may be determined based on the size of the configured CFR. For example, when DL resource allocation Type 1 is applied, Y may be equal to $$\lceil \log_2(N_{RB}^{DL,CLR}(N_{RB}^{DL,CFR}+1)/2) \rceil,$$

and when DL resource allocation Type 0 is applied, Y may be equal to $$\lceil N_{RB}^{DL,CFR}/P \rceil.$$

The prerequisite is $$\lceil \log_2(N_{RB}^{DL,CFR}(N_{RB}^{DL,CFR}+1)/2) \rceil$$

for DL resource allocation Type 1 and $$\lceil N_{RB}^{DL,CFR}/P \rceil <= \lceil \log_2(N_{RB}^{DL,BWP}(N_{RB}^{DL,BWP}+1)/2) \rceil + M$$

for DL resource allocation Type 0 so that a CFR can be configured with a maximum of $X_{max}$ RBs. When the CFR is configured with RBs smaller than $X_{max}$ RBs, at least one padding bit (e.g., "0") may be added to the FDRA field (as the MSB(s) or LSB(s)) of the first DCI format or added to (e.g., the end of) the first DCI format so that the UE-specific fallback DCI format and the first DCI format can have the same payload size.

Table 4 below shows an exemplary first DCI format. It should be understood that Table 4 is only for illustrative purposes, and should not be construed as limiting the embodiments of the present disclosure.

TABLE 4

Fields of the first DCI format

| DCI fields | Size (bits) |
|---|---|
| ~~Identifier for DCI formats~~ | ~~1~~ |
| Frequency domain resource assignment | $\lceil \log_2(N_{RB}^{DL,CFR}(N_{RB}^{DL,CFR}+1)/2\rceil$ for DL resource allocation Type 1 or $\lceil N_{RB}^{DL,CFR}/P\rceil$ for DL resource allocation Type 0 |
| Time domain resource assignment | 4 |
| VRB-to-PRB mapping | 1 |
| Modulation and coding scheme | 5 |
| New data indicator | 1 |
| Redundancy version | 2 |
| HARQ process number | 4 |
| Downlink assignment index | 2 |
| ~~TPC command for scheduled PUCCH~~ | ~~2~~ |
| PUCCH resource indicator | 3 |
| PDSCH-to-HARQ_feedback timing indicator | 3 |
| Padding bit(s) | padding bit(s) may be appended to the first DCI format such that its payload size is equal to that of a UE-specific fallback DCI format |

In the example of Table 4, a padding bit(s) may be added to the end of the first DCI format to achieve the payload size alignment. It should be understood that the padding bit(s) may be added to another location of the DCI format in some other embodiments of the present disclosure.

For example, assuming that CORESET 0 including 24 RBs is configured on the serving cell of a UE and 1-bit identifier and 2-bit TPC can be reused for an FDRA indication in the first DCI format, it can be determined that $$\lceil \log_2(N_{RB}^{DL,BWP}(N_{RB}^{DL,BWP}+1)/2)\rceil = 9$$

and M=3.

For DL resource allocation Type 1, according to $\lceil \log_2(X(X+1)/2)\rceil=12$, $X_{max}=90$. The CFR can be configured with a maximum number of 90 RBs which can ensure both DCI formats have the same payload size. For DL resource allocation Type 0, according to $\lceil X/P\rceil=12$, $X_{max}=12\times P$. In this case, the CFR can be configured with, for example, a maximum number of 96 RBs when P=8 and Configuration 1 is configured, or a maximum number of 48 RBs when P=4 and Configuration 1 is configured.

Assuming that a CFR has 48 RBs, the FDRA field includes 11 bits for DL resource allocation Type 1 or 6 bits for DL resource allocation Type 0 and RBG configuration 2. Since $$\lceil \log_2(N_{RB}^{DL,BWP}(N_{RB}^{DL,BWP}+1)/2)\rceil + M = 12,$$

for DL resource allocation Type 1, one padding bit may be added to the end of the DCI format and for DL resource allocation Type 0, 6 padding bits may be added to the end of the DCI format.

According to the above embodiments, the first DCI format and the UE-specific fallback DCI format can have the same payload size and each RB of the CFR can be scheduled by the FDRA field in first DCI format.

In some embodiments of the present disclosure, for a group of UEs receiving an MBS, to determine the number of bits in the FDRA field of the first DCI format, a plurality of contiguous RBs in the frequency domain may be bundled together as a resource allocation granularity. The number of RBs in a RB bundle may be the minimum value which can ensure that the number of bits in the FDRA field of the first DCI format with the resource allocation granularity (e.g., a RB bundle) is equal to or smaller than the number of bits in the FDRA field of the UE-specific fallback DCI format.

In some embodiments, the number of bits in the FDRA field of the first DCI format may be equal to the size of the FDRA field of the UE-specific fallback DCI format. When the number of bits of the FDRA field of the first DCI format prior to padding is smaller than the number of bits of the FDRA field of the UE-specific fallback DCI format, at least one padding bit (e.g., "0") may be added to the FDRA field of the first DCI format until the FDRA fields of the two DCI formats have the same number of bits. The padding bit(s) may be prepended to the FDRA field as the MSB(s) of the FDRA field or appended to the FDRA field as the LSB(s) of the FRDA field.

In some embodiments, the number of bits in the FDRA field of the first DCI format may be determined based on the number of RB bundles of the CFR. When the payload size of the first DCI format prior to padding is smaller than that of the UE-specific fallback DCI format, at least one padding bit (e.g., "0") may be added to the first DCI format (e.g., at the end of the first DCI format) until the two DCI formats have the same payload size.

Assuming that $$N_{RB}^{DL,CFR}$$

denotes the number of RBs within the CFR, $$N_{RB}^{DL,BWP}$$

is given by the size of CORESET 0 if CORESET 0 is configured for the cell or by the size of an initial DL BWP if CORESET 0 is not configured for the cell, the resource allocation procedure according to the above embodiments of the present disclosure can be performed as follows:

Step 1: determine the number of bits (denoted as "Y") of the FDRA field in the UE-specific fallback DCI format according to equation of $$Y' = \lceil \log_2(N_{RB}^{DLBWP}(N_{RB}^{DLBWP}+1)/2)\rceil.$$

Step 2: find out the maximum X ($X_{max}$) which satisfies the equation of $$\lceil \log_2(X(X+1)/2) \rceil = Y'.$$

Step 3: find out the minimum K ($K_{min}$) which satisfies equation of $$X_{max} \geq \lceil N_{RB}^{DL,CFR}/K \rceil,$$

wherein K is the RB bundle size.

Step 4: divide all the RBs within the CFR into $$Z = \lceil N_{RB}^{DL,CFR}/K_{min} \rceil$$

RB bundles. For example, each of the first (Z−1) RB bundles may include consecutive $K_{min}$ RBs and the last RB bundle may include the remaining $$N_{RB}^{DL,CFR} - (Z-1)K_{min}$$

RBs. In another example, the first RB bundle may include, $$N_{RB}^{DL,CFR} - (Z-1)K_{min},$$

and the second to the $Z^{th}$ RB bundles may include consecutive $K_{min}$ RBs. Other methods for dividing the CFR into Z RB bundles may also be applied.

Step 5A: according to some embodiments of the present disclosure, the FDRA field of the first DCI format may have Y' bits. The Z RB bundles can be indicated by $\lceil \log_2(Z(Z+1)/2) \rceil$. When $\lceil \log_2(Z(Z+1)/2) \rceil < Y'$, $(Y' - \lceil \log_2(Z(Z+1)/2) \rceil)$ padding bits may be added to the FDRA field.

Step 5B (as an alternative of step 5A): according to some other embodiments of the present disclosure, the FDRA field of the first DCI format may have $\lceil \log_2(Z(Z+1)/2) \rceil$ bits. Padding bits may be added to the first DCI format (at the end of the DCI format) such that the first DCI format and the UE-specific fallback DCI format have the same payload size.

Step 6: derive the allocated RBs according to the FDRA field in the first DCI format in the unit of RB bundle. For example, each RB bundle may include $K_{min}$ contiguous RBs except for the last RB bundle which may include smaller number of RBs than $K_{min}$ RBs.

In this way, the FDRA field in the first DCI format may have the same or smaller number of bits than that in the UE-specific fallback DCI format. Furthermore, each RB of the CFR can be scheduled by the FDRA field in the first DCI format.

An exemplary resource allocation procedure according to the above embodiments is shown below. In this example, it is assumed that the CFR is configured with 106 RBs corresponding to 20 MHz bandwidth and 15 kHz SCS, and CORESET 0 including 24 RBs is configured on the serving cell.

In step 1, determine $$Y' = \lceil \log_2(N_{RB}^{DL,BWP}(N_{RB}^{DL,BWP}+1)/2) \rceil = 9.$$

In step 2, determine $X_{max}$=31 satisfying $\lceil \log_2(X(X+1)/2) \rceil$=Y'.

In step 3, determine $K_{min}$=4 satisfying $$X_{max} \geq \lceil N_{RB}^{DL,CFR}/K \rceil;$$

In step 4, divide all the 106 RBs within the CFR into Z=27 RB bundles. For example, each of the first 26 RB bundles includes 4 consecutive RBs and the last RB bundle includes the remaining 2 RBs.

In step 5A: according to some embodiments of the present disclosure, the FDRA field of the first DCI format has 9 bits. Since $\lceil \log_2(Z(Z+1)/2) \rceil$=9=Y', no padding bits are needed in the FDRA field.

Alternatively, in step 5B: according to some other embodiments of the present disclosure, the FDRA field of the first DCI format has $\lceil \log_2(Z(Z+1)/2) \rceil$=9 bits. Padding bits may be added to the end of the first DCI format such that it has the same payload size as the UE-specific fallback DCI format.

In step 6, derive the allocated RBs according to the FDRA field in the first DCI format in the unit of RB bundle. For example, each RB bundle includes 4 RBs except the last RB bundle which includes remaining 2 RBs. The 27 RB bundles require 9 bits in FDRA field for RB allocation so both DCI formats have same size in the FDRA field.

In some embodiments of the present disclosure, for a group of UEs receiving an MBS, to determine the number of bits in the FDRA field of the first DCI format, DL resource allocation Type 0 may be used for the first DCI format when (1) a CFR is configured with more RBs than CORESET 0 (if configured) or an initial DL BWP (if CORESET 0 is not configured) or (2) the FDRA field of the first DCI format requires more bits than the FDRA field of the UE-specific fallback DCI format if DL resource allocation Type 1 is applied for the first DCI format.

When DL resource allocation Type 0 is applied, for a given CFR bandwidth, the minimum size of RBG among possible RBG configurations (e.g., as shown in Table 2) is identified such that the number of RBGs is equal to or smaller than the number of bits in the FDRA field of the UE-specific fallback DCI format. Based on the identified minimum RBG size, the number of RBGs within the CFR can be determined so that the number of required bits for frequency domain resource allocation is equal to the number of RBGs.

In some embodiments, the number of bits in the FDRA field of the first DCI format may be equal to that of the FDRA field of the UE-specific fallback DCI format. When the number of RBGs within the CFR is smaller than the number of bits of the FDRA field of the UE-specific fallback DCI format, at least one padding bit (e.g., "0") may be added to the FDRA field of the first DCI format until the FDRA fields of the two DCI formats have the same number of bits. The padding bit(s) may be prepended to the FDRA field as the MSB(s) of the FDRA field or appended to the FDRA field as the LSB(s) of the FRDA field.

In some embodiments, the number of bits in the FDRA field of the first DCI format may be determined based on the number of RBGs within the CFR. When the payload size of the first DCI format prior to padding is smaller than that of the UE-specific fallback DCI format, at least one padding bit (e.g., “0”) may be added to the first DCI format (e.g., at the end of the first DCI format) until the two DCI formats have the same payload size.

Assuming $$N_{RB}^{DL,CFR}$$

denotes the number of RBs within the CFR, $$N_{RB}^{DL,BWP}$$

is given by the size of CORESET 0 if CORESET 0 is configured for the cell or by the size of an initial DL BWP if CORESET 0 is not configured for the cell, the resource allocation procedure according to the above embodiments of the present disclosure can be performed as below:

Step 0': determine whether (1) a CFR includes more RBs than CORESET 0 (if configured) or the initial DL BWP (if CORESET 0 is not configured) or (2) the FDRA field of the first DCI format according to DL resource allocation Type 1 requires more bits than the FDRA field of the UE-specific fallback DCI format. If YES, go to Step 1'; and if NO, skip the following steps and use the existing resource allocation procedure.

Step 1': determine the number of bits (denoted as “Y'”) of the FDRA field in the UE-specific fallback DCI format according to equation of $$Y' = \lceil \log_2(N_{RB}^{DLBWP}(N_{RB}^{DLBWP}+1)/2) \rceil.$$

Step 2': according to the current RBG configuration, find out the minimum P ($P_{min}$) which satisfies the equation of $$\lceil N_{RB}^{DL,CFR}/P \rceil \le Y',$$

wherein P is the RBG size determined based on the number of RBs within the CFR and RBG sizes among RBG configurations, for example, Configuration 1 and Configuration 2 as shown in Table 2.

Step 3': divide all the RBs within the CFR into $$Z = \lceil N_{RB}^{DL,CFR}/P_{min} \rceil$$

RBGs. For example, each of the first (Z–1) RBGs may include consecutive $P_{min}$ RBs and the last RBG may include the remaining $$N_{RB}^{DL,CFR} - (Z-1)P_{min}$$

RBs. In another example, the first RBG may include $$N_{RB}^{DL,CFR} - (Z-1)P_{min}$$

RBs, and the second to the $Z^{th}$ RBGs may include consecutive $P_{min}$ RBs. Other methods for dividing the CFR into Z RBGs may also be applied.

Step 4A': according to some embodiments of the present disclosure, the FDRA field of the first DCI format may have Y' bits. The Z RBGs can be indicated by Z bits. When Z<Y', (Y'–Z) padding bits may be added to the FDRA field such that the size of the FDRA field of the first DCI format is Y.

Step 4B' (as an alternative of step 4A'): according to some other embodiments of the present disclosure, the FDRA field of the first DCI format may have Z bits. Padding bits may be added to the first DCI format (at the end of the DCI format) such that the first DCI format and the UE-specific fallback DCI format have the same payload size.

Step 5': derive the allocated RBs according to the FDRA field in the first DCI format in the unit of RBG. For example, each RBG includes $P_{min}$ contiguous RBs except for the last RBG which may include smaller number of RBs than $P_m$ RBs.

In this way, the number of bits in the FDRA field of the first DCI format may not be larger than that in the FDRA field of the UE-specific fallback DCI format. Furthermore, each RB of the CFR can be scheduled by the FDRA field in the first DCI format.

An exemplary resource allocation procedure according to the above embodiments is shown below. In this example, it is assumed that the CFR is configured with 106 RBs corresponding to 20 MHz bandwidth and 15 kHz SCS, and CORESET 0 including 24 RBs is configured on the serving cell.

In step 0', determine CFR configured with 106 RBs is larger than CORESET 0 and perform below steps.

In step 1', determine $$Y' = \lceil \log_2(N_{RB}^{DL,BWP}(N_{RB}^{DL,BWP}+1)/2) \rceil = 9;$$

In step 2', determine $P_{min}$=16 among RBG configuration 1 and configuration 2 as shown in Table 2 satisfying $$\lceil N_{RB}^{DL,CFR}/P \rceil \le Y';$$

In step 3', divide all the 106 RBs within the CFR into $$Z = \lceil N_{RB}^{DL,CFR}/P_{min} \rceil = 7$$

RBGs. For example, each of the first 6 RBGs includes 16 consecutive RBs and the last RBG includes the remaining 10 RBs.

In step 4A': according to some embodiments of the present disclosure, the FDRA field of the first DCI format has 9 bits. Since 2<Y'(7<9), 2 padding bits are added to the FDRA field so that the size of the FDRA field is equal to 9 bits. In other words, 2 bits of the 9-bit FDRA field are reserved.

Alternatively, in step 4B': according to some other embodiments of the present disclosure, the FDRA field of the first DCI format has 7 bits. Padding bits may be added to the end of the first DCI format such that it has the same payload size as the UE-specific fallback DCI format.

In step 5: derive the allocated RBs according to the FDRA field in the first DCI format in the unit of RBG. For example, RBG includes 16 contiguous RBs except the last RBG which includes the remaining 10 RBs.

In some embodiments of the present disclosure, for a group of UEs receiving an MBS, a concept of subband is introduced for dividing the CFR into at least one subband. The bandwidth of a subband may be equal to that of CORESET 0 (if configured on the cell) or an initial DL BWP (if CORESET 0 is not configured on the cell) and may have the same SCS and CP length as the CFR. When the bandwidth of the CFR is not an integer multiple of the bandwidth of CORESET 0 or the initial DL BWP, the bandwidth of a subband (e.g., the first or last subband or any predefined subband) of the CFR may be smaller than that of CORESET 0 or the initial DL BWP.

DL resource allocation Type 1 may be used in each subband and the same RB allocation may be repeated within each subband. In other words, the resource allocation may be performed independently within each subband. For example, the indicated RIV value may be applied independently to each subband with the starting RB of the RIV being reference to the starting RB of each subband. For the subband with the smaller size than other subbands, some RBs indicated by the RIV may not be available on this subband so that only part of the scheduled RBs may be used.

The FDRA field of the first DCI format thus may include two parts: the first part may indicate the RB allocation within a single subband and the second part may indicate the allocated subbands. As mentioned above, the allocated subbands may have the same RB allocation. The size of the first part may be equal to that of the FDRA field of the UE-specific fallback DCI format. The size of the second part may be dependent on the method for indicating the allocated subbands. The second part may reuse the DCI field(s) that is not useful for the group-common PDCCH of an MBS.

For example, in some embodiments, a bitmap in the group-common DCI (e.g., the first DCI format) with each bit corresponding to a corresponding subband of the at least one subband may be used to indicate the allocated subbands for GC-PDSCH transmission. In these embodiments, the number of bits of the bitmap is equal to the number of the at least one subband.

In some embodiments, a resource indication value (RIV) based indication may be used to indicate the allocated subbands. For example, the DCI format may include an indicator for indicating a starting subband of one or more allocated subbands of the at least one subband and the number of contiguously allocated subbands of the one or more allocated subbands of the at least one subband. In these embodiments, $\lceil \log_2(R(R+1)/2) \rceil$ bits are required in a DCI format for indicating the allocation subbands, where R is the number of the at least one subband.

For example, assuming that a CFR is configured with 106 RBs corresponding to 20 MHz bandwidth and 15 kHz SCS and CORESET 0 including 24 RBs is configured on the serving cell, the CFR may be divided into $\lceil 106/24 \rceil = 5$ subbands. In some examples, the first four subbands may include 24 RBs, and the last subband may include 10 RBs. $\lceil \log_2(24\ (24+1)/2) \rceil = 9$ bits are needed for indicating an RIV in each subband. In some embodiments, the first DCI format may include 5 bits for indicating a bitmap of the 5 subbands. Therefore, 14 bits are required for indicating the two parts of the FDRA information. In some other embodiments, the first DCI format may include 4 bits to indicate the RIV of the 5 subbands. Therefore, 13 bits are required for indicating the two parts of the FDRA information. In some examples, the 3-bit PUCCH resource indicator and the 2-bit TPC can be reused for an FDRA indication in the first DCI format. Therefore, the FDRA field of the first DCI format thus may include 14 bits. When the size of the FDRA field is greater than the number of bits required for indicating the two parts of the FDRA information, at least one bit (e.g., MSB(s)) of the FDRA field may be reserved. For example, in the case that 13 bits are required for indicating the two parts of the FDRA information, the MSB of the 14-bit FDRA field of the first DCI format may be reserved.

Figure 3:
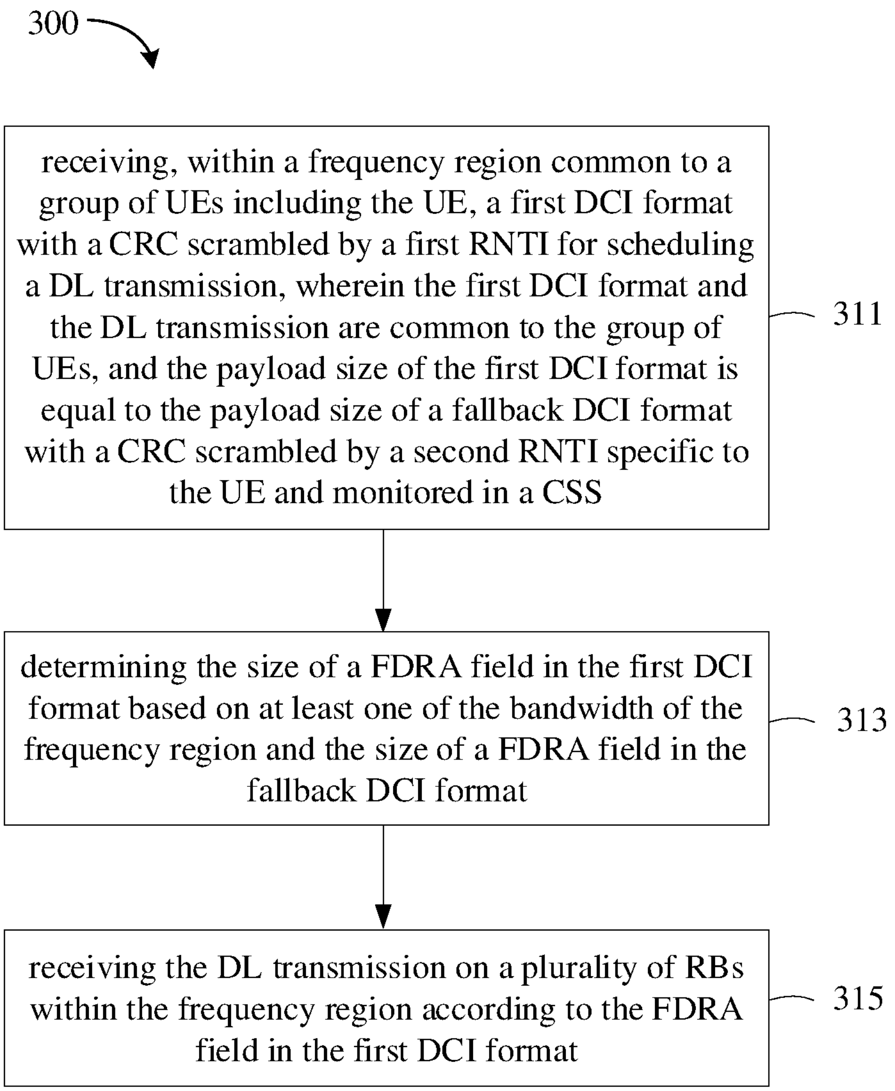
FIG. 3 illustrates a flow chart of an exemplary procedure of wireless communications in accordance with some embodiments of the present disclosure.

FIG. 3 illustrates a flow chart of an exemplary procedure 300 for wireless communications in accordance with some embodiments of the present disclosure. Details described in all of the foregoing embodiments of the present disclosure are applicable for the embodiments shown in FIG. 3. In some examples, the procedure may be performed by a UE, for example, UE 101 in FIG. 1.

Referring to FIG. 3, in operation 311, a UE may receive, within a frequency region common to a group of UEs including the UE, a first DCI format with a CRC scrambled by a first RNTI for scheduling a DL transmission. The first DCI format and the DL transmission may be common to the group of UEs. The payload size of the first DCI format may be equal to the payload size of a fallback DCI format with a CRC scrambled by a second RNTI specific to the UE and monitored in a CSS. The first RNTI may be a G-RNTI and the second RNTI may be a C-RNTI.

In operation 313, the UE may determine the size of an FDRA field in the first DCI format based on at least one of the bandwidth of the frequency region and the size of an FDRA field in the fallback DCI format. In operation 315, the UE may receive the DL transmission on a plurality of RBs within the frequency region according to the FDRA field in the first DCI format.

In some embodiments, the maximum size of the frequency region may be determined based on the maximum number of RBs indicated by a combination of the size of the FDRA field in the fallback DCI format and a first number of bits in the first DCI format reused for an FDRA field. For example, a BS may ensure that the bandwidth of the frequency region configured to the UE does not exceed the maximum size of the frequency region.

In some examples, the size of the FDRA field in the first DCI format may be equal to the combination of the size of the FDRA field in the fallback DCI format and the first number of bits in the first DCI format reused for an FDRA field. Some bits of the FDRA field in the first DCI format may be reserved when the UE is configured with a frequency region having a bandwidth smaller than the maximum size of the frequency region. In some other examples, the size of the FDRA field in the first DCI format may be determined based on the size of the frequency region. A padding bit(s) may be added to the first DCI format such that its payload size is equal to that of the fallback DCI format.

In some embodiments, RBs in the frequency region may be bundled into a plurality of RB bundles. The FDRA field in the first DCI format may indicate one or more allocated RB bundles of the plurality of RB bundles. The number of RBs in an RB bundle of the plurality of RB bundles may be determined based on the minimum value (e.g., $K_{min}$) which ensures that a bit size for indicating the one or more allocated RB bundles of the plurality of RB bundles is equal to or smaller than the size of the FDRA field in the fallback DCI format.

In some examples, the size of the FDRA field in the first DCI format may be equal to the size of the FDRA field in the fallback DCI format. In some other examples, the size of the FDRA field in the first DCI format may be determined based on the number of the plurality of RB bundles.

In some embodiments, a first DL resource allocation type (e.g., DL resource allocation Type 0) may be used for the FDRA field in the first DCI format in response to at least one of following: the frequency region being configured with more RBs than the maximum number of RBs scheduled by the fallback DCI format, and a bit size for indicating allocated RBs in the frequency region according to a second DL resource allocation type (e.g., DL resource allocation Type 1) being greater than the size of the FDRA field in the fallback DCI format. The first DL resource allocation type uses the minimum size of RBG (e.g., $P_{min}$) among possible RBG configurations which ensures that the number of RBGs in the frequency region is equal to or smaller than the size of the FDRA field in the fallback DCI format.

In some examples, the size of the FDRA field in the first DCI format may be equal to the size of the FDRA field in the fallback DCI format. In some other examples, the size of the FDRA field in the first DCI format may be determined based on the number of RBGs in the frequency region.

In some embodiments, the frequency region may be divided into at least one subband, each of which may have less or the same bandwidth as the CORESET 0 in response to the CORESET 0 being configured or an initial DL BWP of the UE in response to the CORESET 0 being not configured. The FDRA field in the first DCI format may indicate an RIV to be independently applied to each subband of the at least one subband.

In some examples, the first DCI format may include a bitmap for indicating allocated subbands of the at least one subband, and each bit of the bitmap may correspond to a respective subband of the at least one subband. In some other examples, the first DCI format may include an indicator for indicating a starting subband of one or more allocated subbands of the at least one subband and the number of contiguously allocated subbands of the one or more allocated subbands of the at least one subband.

The size of the FDRA field in the first DCI format may be determined based on the bandwidth of the CORESET 0 in response to the CORESET 0 being configured or the initial DL BWP in response to the CORESET 0 being not configured.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
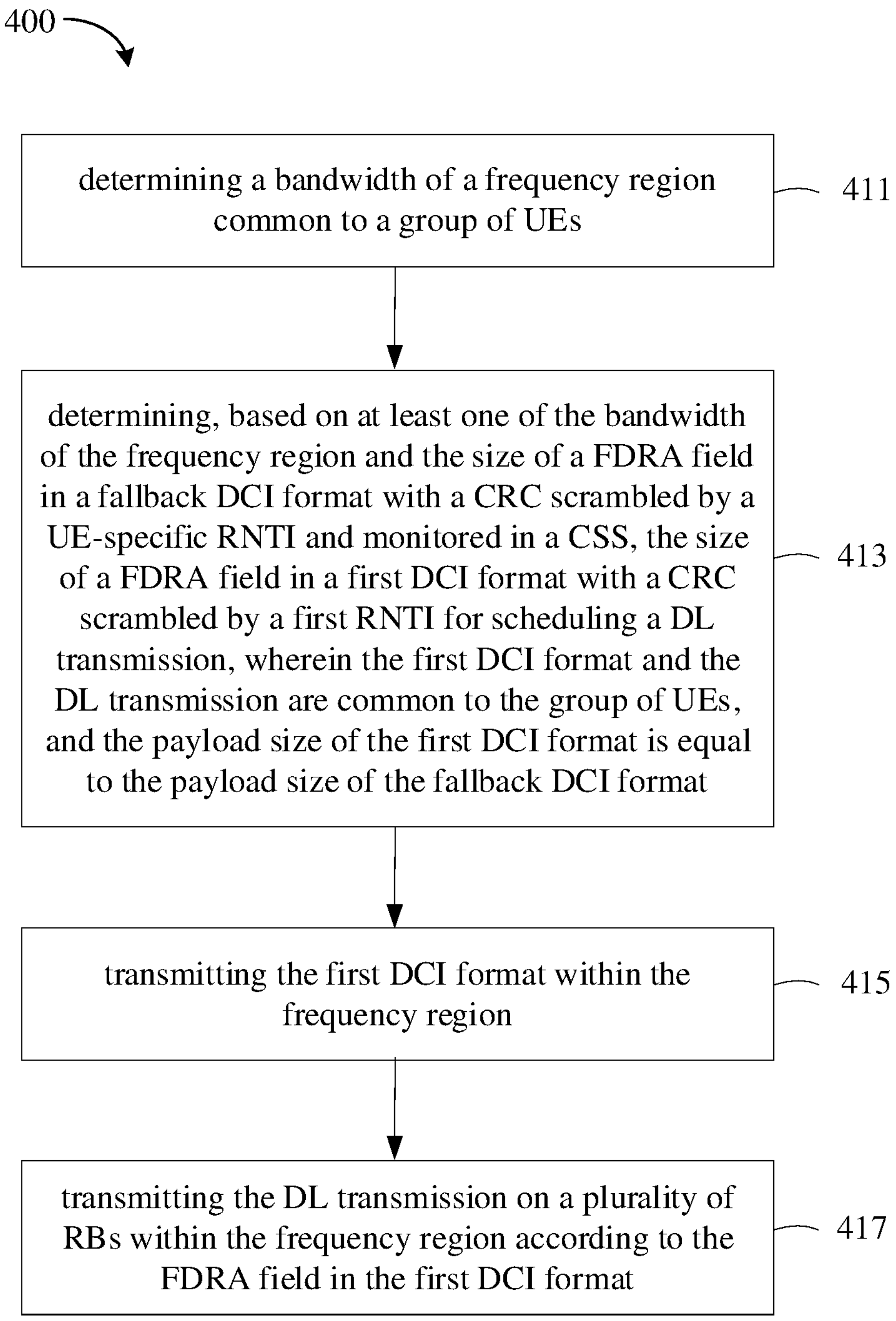
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a BS, for example, BS 102 in FIG. 1.

Referring to FIG. 4, in operation 411, a BS may determine a bandwidth of a frequency region common to a group of UEs.

In operation 413, the BS may determine, based on at least one of the bandwidth of the frequency region and the size of an FDRA field in a fallback DCI format with a CRC scrambled by a UE-specific RNTI and monitored in a CSS, the size of an FDRA field in a first DCI format with a CRC scrambled by a first RNTI for scheduling a DL transmission, wherein the first DCI format and the DL transmission are common to the group of UEs, and the payload size of the first DCI format is equal to the payload size of the fallback DCI format.

In some embodiments, the maximum size of the frequency region may be determined based on the maximum number of RBs indicated by a combination of the size of the FDRA field in the fallback DCI format and a first number of bits in the first DCI format reused for an FDRA field.

In some examples, the size of the FDRA field in the first DCI format may be equal to the combination of the size of the FDRA field in the fallback DCI format and the first number of bits in the first DCI format reused for an FDRA field. In response to a bit size for indicating allocated RBs in the frequency region being smaller than the size of the FDRA field in the first DCI format, at least one bit (e.g., MSB(s) or LSB(s)) of the FDRA field in the first DCI format is reserved.

In some other examples, the size of the FDRA field in the first DCI format may be determined based on the size of the frequency region. In response to the size of the FDRA field in the first DCI format being smaller than the combination of the size of the FDRA field in the fallback DCI format and the first number of bits in the first DCI format reused for an FDRA field, the first DCI format may be padded with at least one padding bit such that the payload size of the first DCI format is equal to that of the fallback DCI format.

In some embodiments. RBs in the frequency region may be bundled into a plurality of RB bundles. The FDRA field in the first DCI format may indicate one or more allocated RB bundles of the plurality of RB bundles. The number of RBs in an RB bundle of the plurality of RB bundles may be determined based on the minimum value (e.g., $K_{min}$) which ensures that a bit size for indicating the one or more allocated RB bundles of the plurality of RB bundles is equal to or smaller than the size of the FDRA field in the fallback DCI format.

In some examples, the size of the FDRA field in the first DCI format may be equal to the size of the FDRA field in the fallback DCI format. In response to the bit size for indicating the one or more allocated RB bundles of the plurality of RB bundles being smaller than the size of the FDRA field in the first DCI format, at least one bit of the FDRA field in the first DCI format may be reserved.

In some other examples, the size of the FDRA field in the first DCI format may be determined based on the number of the plurality of RB bundles. In response to the size of the FDRA field in the first DCI format being smaller than the size of the FDRA field in the fallback DCI format, the first DCI format may be padded with at least one padding bit such that the payload size of the first DCI format is equal to that of the fallback DCI format.

In some embodiments, a first DL resource allocation type may be used for the FDRA field in the first DCI format in response to at least one of following: the frequency region including more RBs than the maximum number of RBs scheduled by the fallback DCI format, and a bit size for indicating allocated RBs in the frequency region according to a second DL resource allocation type being greater than the size of the FDRA field in the fallback DCI format. The first DL resource allocation type may use the minimum size of RBG (e.g., $P_{min}$) among possible RBG configurations which ensures that the number of RBGs in the frequency region is equal to or smaller than the size of the FDRA field in the fallback DCI format.

In some examples, the size of the FDRA field in the first DCI format may be equal to the size of the FDRA field in the fallback DCI format. In response to the number of RBGs in the frequency region being smaller than the size of the FDRA field in the first DCI format, at least one bit of the FDRA field in the first DCI format may be reserved.

In some other examples, the size of the FDRA field in the first DCI format may be determined based on the number of RBGs in the frequency region. In response to the size of the FDRA field in the first DCI format being smaller than the size of the FDRA field in the fallback DCI format, the first DCI format may be padded with at least one padding bit such that the payload size of the first DCI format is equal to that of the fallback DCI format.

In some embodiments, the frequency region may be divided into at least one subband, each of which may have the same or less bandwidth as CORESET 0 in response to the CORESET 0 being configured or an initial DL BWP of the group of UEs in response to the CORESET 0 being not configured. The FDRA field in the first DCI format may indicate an RIV to be independently applied to each subband of the at least one subband.

In some examples, the first DCI format may include a bitmap for indicating allocated subbands of the at least one subband, and each bit of the bitmap may correspond to a respective subband of the at least one subband. In some other examples, the first DCI format may include an indicator for indicating a starting subband of one or more allocated subbands of the at least one subband and the number of contiguously allocated subbands of the one or more allocated subbands of the at least one subband.

The size of the FDRA field in the first DCI format may be determined based on the bandwidth of the CORESET 0 in response to the CORESET 0 being configured or the initial DL BWP in response to the CORESET 0 being not configured.

In operation 415, the BS may transmit the first DCI format within the frequency region. In operation 417, the BS may transmit the DL transmission on a plurality of RBs within the frequency region according to the FDRA field in the first DCI format.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
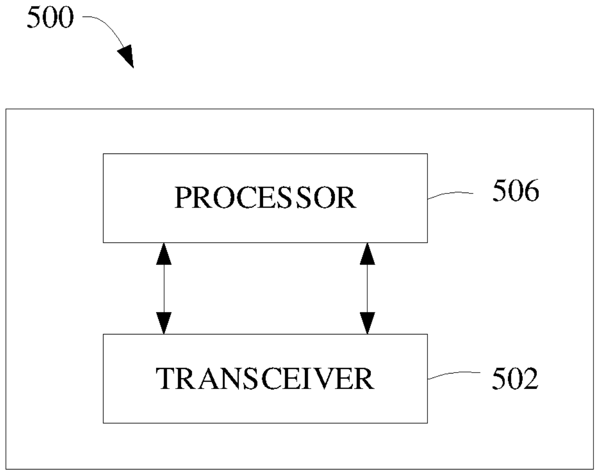
FIG. 5 illustrates a block diagram of an exemplary apparatus in accordance with some embodiments of the present disclosure.

FIG. 5 illustrates a block diagram of an exemplary apparatus 500 according to some embodiments of the present disclosure. Details described in all of the foregoing embodiments of the present disclosure are applicable for the embodiments shown in FIG. 5.

As shown in FIG. 5, the apparatus 500 may include at least one processor 506 and at least one transceiver 502 coupled to the processor 506. The apparatus 500 may be a UE or a BS.

Although in this figure, elements such as the at least one transceiver 502 and processor 506 are described in the singular, the plural is contemplated unless a limitation to the singular is explicitly stated. In some embodiments of the present application, the transceiver 502 may be divided into two devices, such as a receiving circuitry and a transmitting circuitry. In some embodiments of the present application, the apparatus 500 may further include an input device, a memory, and/or other components.

In some embodiments of the present application, the apparatus 500 may be a UE. The transceiver 502 and the processor 506 may interact with each other so as to perform the operations with respect to the UE described in FIGS. 1-4. In some embodiments of the present application, the apparatus 500 may be a BS. The transceiver 502 and the processor 506 may interact with each other so as to perform the operations with respect to the BS described in FIGS. 1-4.

In some embodiments of the present application, the apparatus 500 may further include at least one non-transitory computer-readable medium.

For example, in some embodiments of the present disclosure, the non-transitory computer-readable medium may have stored thereon computer-executable instructions to cause the processor 506 to implement the method with respect to the UE as described above. For example, the computer-executable instructions, when executed, cause the processor 506 interacting with transceiver 502, so as to perform the operations with respect to the UE described in FIGS. 1-4.

In some embodiments of the present disclosure, the non-transitory computer-readable medium may have stored thereon computer-executable instructions to cause the processor 506 to implement the method with respect to the BS as described above. For example, the computer-executable instructions, when executed, cause the processor 506 interacting with transceiver 502 to perform the operations with respect to the BS described in FIGS. 1-4.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A user equipment (UE), comprising:

at least one memory; and at least one processor coupled with the at least one memory and configured to cause the UE to:

receive, within a frequency region common to a group of UEs including the UE, a first downlink control information (DCI) format with a cyclic redundancy check (CRC) scrambled by a first radio network temporary identifier (RNTI) for scheduling a downlink (DL) transmission, wherein the first DCI format and the DL transmission are common to the group of UEs, and a payload size of the first DCI format is equal to the payload size of a fallback DCI format with a CRC scrambled by a second RNTI specific to the UE and monitored in a common search space (CSS);

determine the size of a frequency domain resource allocation (FDRA) field in the first DCI format based on at least one of a bandwidth of the frequency region and the size of an FDRA field in the fallback DCI format; and receive the DL transmission on a plurality of resource blocks (RBs) within the frequency region according to the FDRA field in the first DCI format.

2. The UE of claim 1, wherein the maximum size of the frequency region is determined based on the maximum number of RBs indicated by a combination of the size of the FDRA field in the fallback DCI format and a first number of bits in the first DCI format reused for an FDRA field.

3. The UE of claim 2, wherein the size of the FDRA field in the first DCI format is equal to the combination of the size of the FDRA field in the fallback DCI format and the first number of bits in the first DCI format reused for an FDRA field; or wherein the size of the FDRA field in the first DCI format is determined based on the size of the frequency region.

4. The UE of claim 1, wherein RBs in the frequency region are bundled into a plurality of RB bundles, and the FDRA field in the first DCI format indicates one or more allocated RB bundles of the plurality of RB bundles.

5. The UE of claim 4, wherein a number of RBs in an RB bundle of the plurality of RB bundles is determined based on the minimum value which ensures that a bit size for indicating the one or more allocated RB bundles of the plurality of RB bundles is equal to or smaller than the size of the FDRA field in the fallback DCI format.

6. The UE of claim 5, wherein the size of the FDRA field in the first DCI format is equal to the size of the FDRA field in the fallback DCI format; or the size of the FDRA field in the first DCI format is determined based on the number of the plurality of RB bundles.

7. The UE of claim 1, wherein a first DL resource allocation type is used for the FDRA field in the first DCI format in response to at least one of following:

the frequency region being configured with more RBs than the maximum number of RBs scheduled by the fallback DCI format, and a bit size for indicating allocated RBs in the frequency region according to a second DL resource allocation type being greater than the size of the FDRA field in the fallback DCI format.

8. The UE of claim 7, wherein the first DL resource allocation type uses the minimum size of resource block group (RBG) among possible RBG configurations which ensures that the number of RBGs in the frequency region is equal to or smaller than the size of the FDRA field in the fallback DCI format.

9. The UE of claim 8, wherein the size of the FDRA field in the first DCI format is equal to the size of the FDRA field in the fallback DCI format; or the size of the FDRA field in the first DCI format is determined based on the number of RBGs in the frequency region.

10. The UE of claim 1, wherein the frequency region is divided into at least one subband, each of which has less or the same bandwidth as control resource set (CORESET) 0 in response to the CORESET 0 being configured or an initial DL bandwidth part (BWP) of the UE in response to the CORESET 0 being not configured.

11. The UE of claim 10, wherein the FDRA field in the first DCI format indicates a resource indication value (RIV) to be independently applied to each subband of the at least one subband.

12. The UE of claim 10, wherein the first DCI format includes a bitmap for indicating allocated subbands of the at least one subband, and each bit of the bitmap corresponds to a respective subband of the at least one subband; or wherein the first DCI format includes an indicator for indicating a starting subband of one or more allocated subbands of the at least one subband and a number of contiguously allocated subbands of the one or more allocated subbands of the at least one subband.

13. The UE of claim 10, wherein the size of the FDRA field in the first DCI format is determined based on the bandwidth of the CORESET 0 in response to the CORESET 0 being configured or the initial DL BWP in response to the CORESET 0 being not configured.

14. A base station (BS), comprising:

at least one memory; and at least one processor coupled with the at least one memory and configured to cause the base station to:

determine a bandwidth of a frequency region common to a group of user equipment (UE);

determine, based on at least one of the bandwidth of the frequency region and a size of a frequency domain resource allocation (FDRA) field in a fallback downlink control information (DCI) format with a cyclic redundancy check (CRC) scrambled by a UE-specific radio network temporary identifier (RNTI) and monitored in a common search space (CSS), the size of an FDRA field in a first DCI format with a CRC scrambled by a first RNTI for scheduling a downlink (DL) transmission, wherein the first DCI format and the DL transmission are common to the group of UEs, and a payload size of the first DCI format is equal to the payload size of the fallback DCI format;

transmit the first DCI format within the frequency region; and transmit the DL transmission on a plurality of resource blocks (RBs) within the frequency region according to the FDRA field in the first DCI format.

15. A method performed by a user equipment (UE), the method comprising:

receiving, within a frequency region common to a group of UEs including the UE, a first downlink control information (DCI) format with a cyclic redundancy check (CRC) scrambled by a first radio network temporary identifier (RNTI) for scheduling a downlink (DL) transmission, wherein the first DCI format and the DL transmission are common to the group of UEs, and a payload size of the first DCI format is equal to the payload size of a fallback DCI format with a CRC scrambled by a second RNTI specific to the UE and monitored in a common search space (CSS);

determining the size of a frequency domain resource allocation (FDRA) field in the first DCI format based on at least one of a bandwidth of the frequency region and the size of an FDRA field in the fallback DCI format; and receiving the DL transmission on a plurality of resource blocks (RBs) within the frequency region according to the FDRA field in the first DCI format.

16. A processor for wireless communication, comprising:

at least one controller coupled with at least one memory and configured to cause the processor to:

receive, within a frequency region common to a group of UEs including the UE, a first downlink control information (DCI) format with a cyclic redundancy check (CRC) scrambled by a first radio network temporary identifier (RNTI) for scheduling a downlink (DL) transmission, wherein the first DCI format and the DL transmission are common to the group of UEs, and a payload size of the first DCI format is equal to the payload size of a fallback DCI format with a CRC scrambled by a second RNTI specific to the UE and monitored in a common search space (CSS);

determine the size of a frequency domain resource allocation (FDRA) field in the first DCI format based on at least one of a bandwidth of the frequency region and the size of an FDRA field in the fallback DCI format; and receive the DL transmission on a plurality of resource blocks (RBs) within the frequency region according to the FDRA field in the first DCI format.

17. The processor of claim 16, wherein the maximum size of the frequency region is determined based on the maximum number of RBs indicated by a combination of the size of the FDRA field in the fallback DCI format and a first number of bits in the first DCI format reused for an FDRA field.

18. The processor of claim 17, wherein the size of the FDRA field in the first DCI format is equal to the combination of the size of the FDRA field in the fallback DCI format and the first number of bits in the first DCI format reused for an FDRA field; or wherein the size of the FDRA field in the first DCI format is determined based on the size of the frequency region.

19. The processor of claim 16, wherein RBs in the frequency region are bundled into a plurality of RB bundles, and the FDRA field in the first DCI format indicates one or more allocated RB bundles of the plurality of RB bundles.

20. The processor of claim 19, wherein a number of RBs in an RB bundle of the plurality of RB bundles is determined based on the minimum value which ensures that a bit size for indicating the one or more allocated RB bundles of the plurality of RB bundles is equal to or smaller than the size of the FDRA field in the fallback DCI format.

* * * * *